United States Patent

Pientka et al.

[11] Patent Number: 6,002,229
[45] Date of Patent: *Dec. 14, 1999

[54] DEVICE FOR OPERATING A WINDSHIELD WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,136

[22] Filed: Jan. 15, 1997

[30] Foreign Application Priority Data

Jan. 19, 1996 [DE] Germany .................. 196 01 805

[51] Int. Cl.$^6$ ............................ B60S 1/08; G05B 5/00
[52] U.S. Cl. .................. 318/483; 318/443; 318/444; 318/DIG. 2; 15/250 C
[58] Field of Search .................. 318/440–483, 318/DIG. 2; 250/214 AC, 339.1; 15/250.13, 250.17, DIG. 15, 250 C

[56] References Cited

U.S. PATENT DOCUMENTS

| 4,091,317 | 5/1978 | Roszyk . |
| 4,825,134 | 4/1989 | Tracht . |
| 4,859,867 | 8/1989 | Larson . |
| 4,859,919 | 8/1989 | Tracht . |
| 5,059,877 | 10/1991 | Teder ........................................ 318/444 |
| 5,140,233 | 8/1992 | Wallrafen ................................ 318/264 |
| 5,140,234 | 8/1992 | Wallrafen ................................ 318/264 |
| 5,157,312 | 10/1992 | Wallrafen ................................ 318/264 |
| 5,172,065 | 12/1992 | Wallafen ................................. 324/683 |
| 5,225,669 | 7/1993 | Hasch et al. ............................ 307/311 |
| 5,252,898 | 10/1993 | Nolting et al. .......................... 318/444 |
| 5,436,541 | 7/1995 | Mangler et al. ........................ 318/483 |
| 5,581,240 | 12/1996 | Egger ....................................... 318/444 |
| 5,666,037 | 9/1997 | Reime ...................................... 318/483 |
| 5,672,946 | 9/1997 | Kawashima et al. .................... 318/444 |
| 5,684,464 | 11/1997 | Egger ....................................... 318/444 |
| 5,691,612 | 11/1997 | Corey ....................................... 318/444 |
| 5,694,012 | 12/1997 | Pientka et al. .......................... 318/444 |

FOREIGN PATENT DOCUMENTS

| 0431245A2 | 6/1991 | European Pat. Off. . |
| 0438633A1 | 7/1991 | European Pat. Off. . |
| 3205771 | 8/1983 | Germany . |
| 4112847 | 10/1992 | Germany . |
| WO 92/18358 | 10/1992 | WIPO . |

OTHER PUBLICATIONS

"Vehicle Wiper Control" Research Disclosure, No. 342, Oct. 1, 1992, Emsworth (GB) p. 782. [B60S1/08F].

*Primary Examiner*—Paul Ip
*Attorney, Agent, or Firm*—Venable; George H. Spencer

[57] ABSTRACT

A device for operating a windshield wiper with an automatic wiper control. The wiping operation is optimally adapted to the wetting conditions of a windshield as soon as the automatic wiper control is turned on. This is achieved by a control stage which, during the switching on, triggers at least one initial wiping action when responding to an activation signal emitted by an input stage. Following the initial wiping action, the wiping operation takes place on the basis of the wetting conditions detected by the sensor unit.

5 Claims, 1 Drawing Sheet

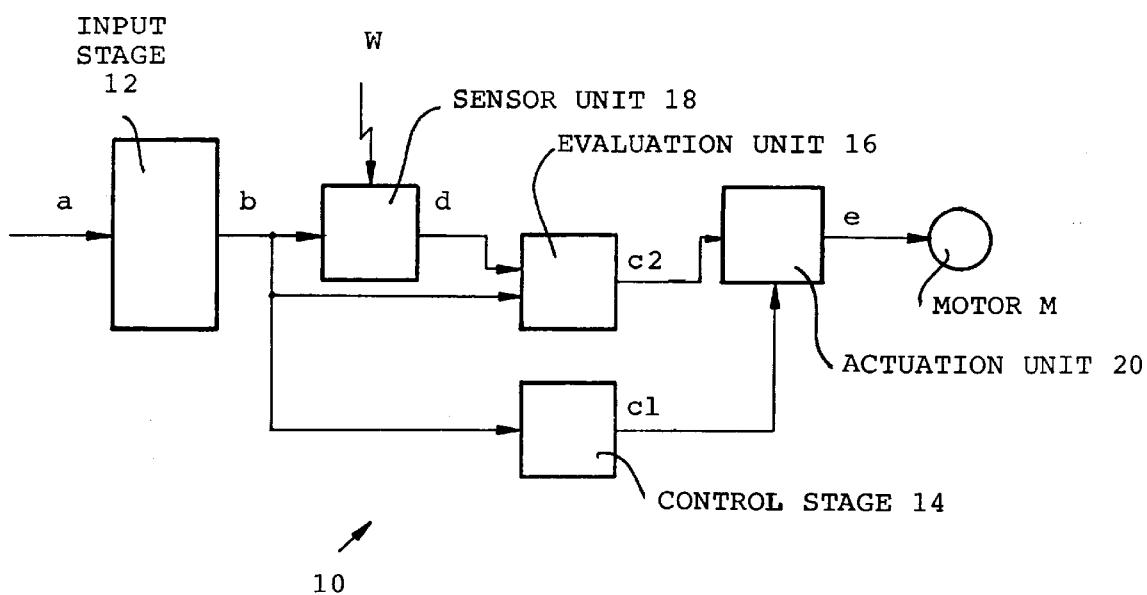

DEVICE FOR OPERATING A WINDSHIELD WIPER

BACKGROUND OF THE INVENTION

The present invention relates to a device for operating a windshield wiper with an automatic wiper control, comprising an input stage that detects the activation of the wiper control, a sensor unit that detects the degree of wetting of a windshield, an evaluation unit that amplifies and evaluates a sensor signal, as well as an actuation unit for a wiper motor.

A device of this type is shown in DE 41 12 847 A1, which has an automatic wiper control with a sensor unit and an evaluation unit for amplifying and evaluating the sensor signal, which unit transmits a control signal to an actuation unit that actuates a wiper motor. The amplification of the sensor signal is adjusted by means of an automatic control to a quiescent level, and a wiping operation is triggered if, starting with this quiescent level, a wetting event on the windshield is detected via the sensor unit, which results in falling short of a predetermined threshold.

The adjusted quiescent level here takes into account the manufacturing tolerances of individual components of the sensor unit, as well as tolerances for mounting the sensor unit. If the automatic wiper control is not turned on, it is not always certain that, when the control is turned on, the device will function at optimum sensitivity, so that it is possible that the wiper will not react optimally when the windshield is first wetted.

It is, therefore, the object of the present invention to provide a device for operating a windshield wiper of the aforementioned type, makes sure that when the wiper is turned on, it will respond optimally to activate the automatic wiper control as a result of a wetting event.

SUMMARY OF THE INVENTION

This object and others are achieved by providing a control stage, which triggers at least one initial wiping action when responding to the activation signal emitted by the input stage during the switching on, and that following this initial wiping action, the wiping operation is based on the wetting conditions detected by the sensor unit. Consequently, the output conditions that are defined for the initializing of the wiper control are already generated during the switching on of the automatic wiper control by the user and that from the beginning, the highest possible sensitivity is adjusted. Based on this, the automatic wiper control can react precisely adjusted to respective wetting events on the windshield. In addition, the wiper operation that is initially triggered following the switching on of the wiper control has the advantage that it lets the driver know that the automatic wiper control has been activated.

The highest sensitivity is already achieved once the wiper control is switched on, by letting the adjustment of the amplification in the evaluation unit take place when the initial wiping action is triggered; by letting the initially adjusted amplification level, independent of the wetting condition of the windshield falls just short of the overamplification limit of an analog/digital converter that receives the amplified signal; by letting an overamplification of the amplified sensor signal, following the initial wiping action, be detectable in the evaluation unit, and by letting the amplification be readjusted in case of an overamplification. If necessary, the amplification is readjusted following the initial wiping operation if it is detected via the evaluation unit that an overamplification exists.

The initial wiping action as well as the subsequent calibration and initialization of the wiper control can be realized simply with a control program.

BRIEF DESCRIPTION OF THE DRAWINGS

These and other features and advantages of the invention will be further understood from the following detailed description of the preferred embodiments with reference to the accompanying drawings in which the single FIGURE shows a block diagram for a wiper control and thereby signals which are produced.

DETAILED DESCRIPTION OF THE PREFERRED EMBODIMENTS

The FIGURE shows a wiper control 10. When the automatic wiper control is turned on, for example by way of a steering column switch, a switching on signal $\underline{a}$ is transmitted to an input stage 12 of the wiper control 10, which subsequently emits an activation signal $\underline{b}$. The activation signal b is transmitted to a control stage 14, which then triggers an actuation unit 20 with the aid of a control signal $\underline{c1}$, which unit emits an output signal $\underline{e}$ for actuating a wiper motor $\underline{M}$.

The activation signal $\underline{b}$ is furthermore supplied either directly or following an appropriate conversion to an evaluation unit 16 which has an amplifier so as to activate this unit and to set an initial amplification level. In addition, a sensor unit 18 is also made operational via the activation signal $\underline{b}$, which sensor unit reacts to a wetting event $\underline{W}$ such as rain, snow or dirt on the windshield and transmits a corresponding sensor signal $\underline{d}$ to the evaluation unit 16. The evaluation unit 16 is also connected to the actuation unit 20 and transmits another control signal $\underline{c2}$ to this unit, which corresponds to the wetting event W.

Following the appearance of the switching on signal $\underline{a}$ and the subsequently emitted activation signal $\underline{b}$, an initial wiping action is triggered by way of the control stage 14 and with the control signal $\underline{c1}$, independent of the operation of the sensor unit 18. Following the activation signal $\underline{b}$, an amplification level is also set in the evaluation unit 16, which falls just short of the overamplification limit of an analog/digital converter that receives the amplified signal. The condition of the windshield, which has not yet been cleaned because the wiper has not yet moved across the sensor of the sensor unit 18, does not matter. The level is not adjusted based on a clean windshield. If an overamplification of the amplified signal is detected at a later point in time, possibly following the movement of the wiper across the windshield, the amplification if readjusted to achieve an optimum sensitivity.

Thanks to the above features, an optimum wiping operation is achieved immediately after the automatic wiper control is switched on and, following the initial wiping action, optimum starting conditions are generated for the calibration and initializing of the sensor unit and the evaluation unit, which ensure a wiping operation that is precisely adjusted to the respective wetting event.

It will be understood that the above description of the present invention is susceptible to various modifications, changes and adaptations, and the same are intended to be comprehended within the meaning and range of equivalents of the appended claims.

What is claimed is:

1. A device for operating a windshield wiper with an automatic wiper control, comprising an input stage for detecting the switching on of the wiper control, a sensor unit that detects the wetting condition of a windshield, an evaluation unit that amplifies and evaluates a sensor signal, an actuation unit for a wiper motor, and a control stage which triggers at least one initial wiping action when responding to an activation signal emitted by the input stage during the switching-on and, following the initial wiping action, causes the wiping operation to take place on the basis of the wetting condition detected by the sensor unit, the adjustment of the amplification in the evaluation unit taking place when the initial wiping action is triggered, and the initially adjusted amplification level, independent of the wetting condition of the windsheild, falling just short of the overamplification limit of an analog/digital converter that receives the amplified signal.

2. Device according to claim 1, further comprising a control program for triggering the initial wiping action.

3. Device according to claim 1, wherein following the initial wiping action, an overamplification of the amplified sensor signal is detectable in the evaluation unit, and wherein case of an overamplification, the amplification can be readjusted.

4. Device according to claim 3, further comprising a control program for triggering the initial wiping action.

5. A device for operating a windshield wiper with an automatic wiper control, comprising:
   (a) an input stage which receives a switching-on signal and puts out an activation signal;
   (b) a control stage connected to receive said activation signal, said control stage producing a first control signal;
   (c) an evaluation unit connected to receive said activation signal, said evaluation unit producing a second control signal;
   (d) a sensor unit connected to receive said activation signal as well as a signal reacting to a wetting event, said sensor unit producing a sensor signal, said evaluation unit being connected to receive said sensor signal;
   (e) an actuation unit connected to receive said first and second control signals, said actuation unit putting out an output signal to actuate a wiper motor.

* * * * *